United States Patent
Terashita

(10) Patent No.: US 7,359,571 B2
(45) Date of Patent: Apr. 15, 2008

(54) METHOD, APPARATUS AND PROGRAM FOR IMAGE PROCESSING

(75) Inventor: Takaaki Terashita, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 848 days.

(21) Appl. No.: 10/367,869

(22) Filed: Feb. 19, 2003

(65) Prior Publication Data

US 2003/0179949 A1 Sep. 25, 2003

(30) Foreign Application Priority Data

Feb. 19, 2002 (JP) ............................. 2002-041343

(51) Int. Cl.
*G06K 9/40* (2006.01)

(52) U.S. Cl. .................. 382/274; 382/254; 382/167

(58) Field of Classification Search ................ 382/274, 382/254, 261, 100, 161, 162, 167; 396/50, 396/225, 234, 292; 358/487, 519, 520, 522; 355/40, 77; 707/2; 434/100
See application file for complete search history.

(56) References Cited

U.S. PATENT DOCUMENTS

| | | | |
|---|---|---|---|
| 5,016,039 A | 5/1991 | Sosa et al. ..................... 396/50 |
| 5,596,387 A | 1/1997 | Takagi ......................... 396/50 |
| 5,710,948 A | 1/1998 | Takagi ......................... 396/50 |
| 5,715,377 A | 2/1998 | Fukushima et al. .......... 395/109 |
| 5,739,924 A | 4/1998 | Sano ............................. 358/487 |
| 5,787,414 A * | 7/1998 | Miike et al. ..................... 707/2 |
| 5,812,286 A | 9/1998 | Lin ............................. 358/519 |
| 5,971,763 A * | 10/1999 | Yau .............................. 434/100 |
| 6,011,547 A | 1/2000 | Shiota et al. ................ 382/254 |
| 6,133,983 A | 10/2000 | Wheeler ....................... 355/40 |
| 7,038,713 B1 | 5/2006 | Matama .................... 348/207.2 |
| 2001/0016064 A1 | 8/2001 | Tsuruoka et al. ........... 382/167 |
| 2001/0035989 A1 | 11/2001 | Takemoto ................... 358/518 |
| 2004/0189818 A1 | 9/2004 | Tsuruoka et al. ........ 348/221.1 |

FOREIGN PATENT DOCUMENTS

| | | |
|---|---|---|
| EP | 0 938 227 A | 8/1999 |
| EP | 1 128 660 A2 | 8/2001 |
| EP | 1 152 589 A2 | 11/2001 |
| EP | 1 370 061 A1 | 12/2003 |
| JP | 8-307767 A | 11/1996 |
| JP | 9-200531 A | 7/1997 |
| JP | 11-88576 A | 3/1999 |
| JP | 11086021 | 3/1999 |

(Continued)

*Primary Examiner*—Anh Hong Do
(74) *Attorney, Agent, or Firm*—Birch, Stewart, Kolasch and Birch, LLP

(57) ABSTRACT

Image processing is carried out accurately on image data obtained by a digital camera, for a high-quality reproduced image. Image data S0 is read and main part information M is acquired. Scene information H is obtained by inferring a photography scene based on the main part information M and photography information T added to the image data S0. A tone processing condition K0 corresponding to the scene information H is read from a memory 24 and a tone processing condition K1 is set by correcting a reference tone processing condition B according to the tone processing condition K0. Image processing is carried out on the image data S0 according to the tone processing condition K1 and image processing conditions G, and processed image data S1 is generated.

26 Claims, 8 Drawing Sheets

FOREIGN PATENT DOCUMENTS

| | | |
|---|---|---|
| JP | 2000-196890 A | 7/2000 |
| JP | 2001-186297 A | 7/2001 |
| JP | 2001-238177 A | 8/2001 |
| JP | 2001222710 | 8/2001 |
| JP | 2001238129 A | 8/2001 |

* cited by examiner

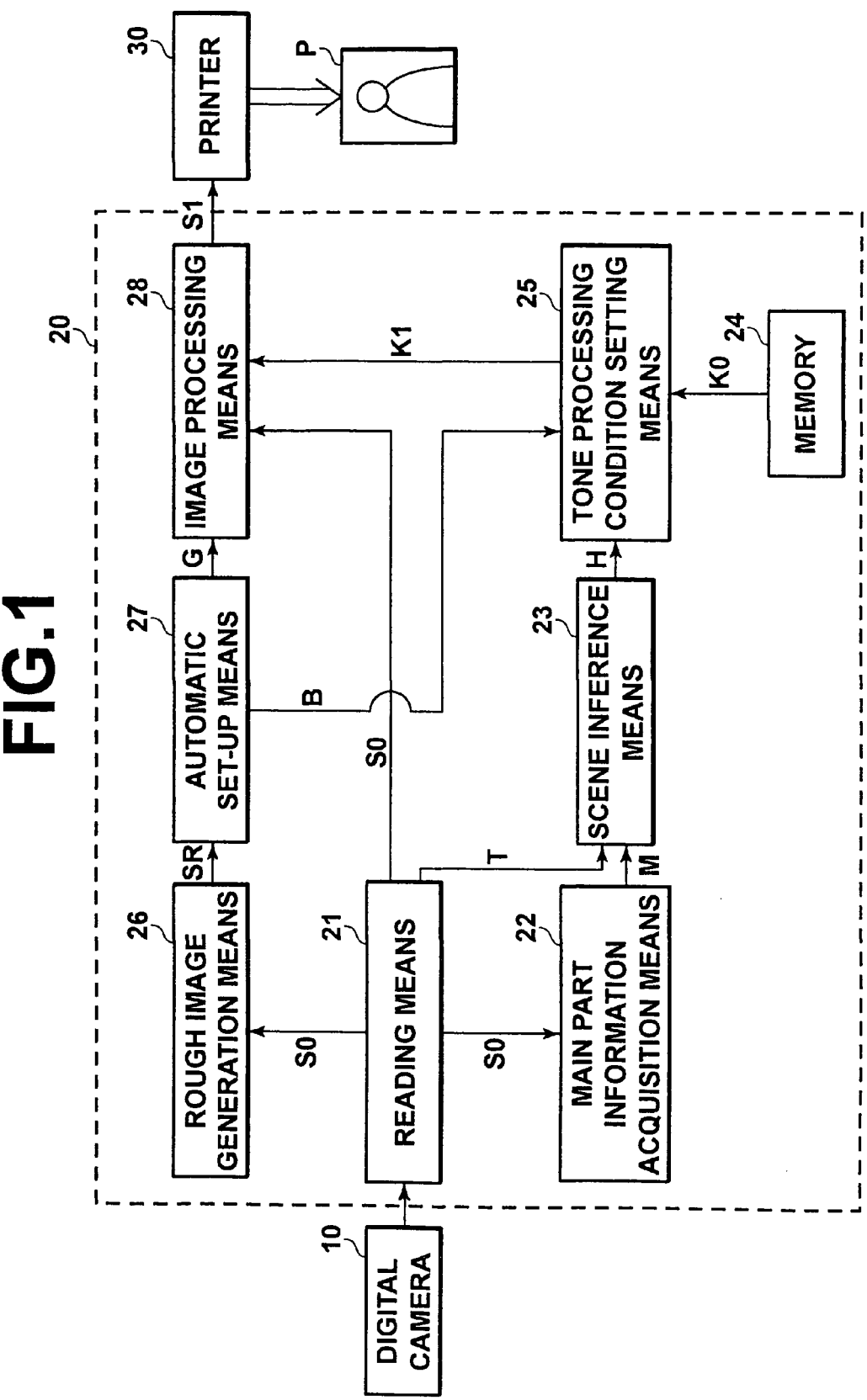

FIG.2

| NO | MAIN PART INFORMATION | | PHOTOGRAPHY INFORMATION | | | | INFERRED SCENE | TONE PROCESSING CONDITION | | |
|----|---|---|---|---|---|---|---|---|---|---|
|  | PRESENCE OR ABCENCE | SIZE | FLASH | SUBJECT DISTANCE | MAGNIFICATION | INFORMATION OF ANOTHER TYPE |  | HIGHLIGHT RANGE | INTERMEDIATE RANGE | SHADOW RANGE |
| 1 | PRESENT | LARGE | OFF |  |  |  | PORTRAIT | SOFTEN | MODESTLY HARDEN |  |
| 2 | PRESENT | SMALL | OFF |  |  |  | CLASS PHOTO | HARDEN |  | MODESTLY SOFTEN |
| 3 | ABSENT |  | OFF |  |  |  | SCENERY, STILL OBJECT | HARDEN |  | MODESTLY SOFTEN |
| 4 | PRESENT | LARGE | ON |  |  |  | PORTRAIT | SOFTEN | MODESTLY HARDEN |  |
| 5 | PRESENT |  | ON |  | LARGE |  | PORTRAIT | SOFTEN | MODESTLY HARDEN |  |
| 6 | PRESENT | SMALL | ON |  |  |  | CLASS PHOTO | MODESTLY HARDEN | MODESTLY HARDEN |  |
| 7 | PRESENT |  | ON |  | SMALL |  | CLASS PHOTO | MODESTLY HARDEN | MODESTLY HARDEN |  |
| 8 | PRESENT | LARGE | ON | SHORT |  |  | CLOSE FLASH PHOTOGRAPHY | HARDEN |  | MODESTLY SOFTEN |
| 9 | PRESENT |  | ON | SHORT | LARGE |  | CLOSE FLASH PHOTOGRAPHY | HARDEN |  | MODESTLY SOFTEN |
| 10 | PRESENT |  | ON |  |  | HIGH BV | DAYTIME SYNCHRONOUS PHOTOGRAPHY | MODESTLY HARDEN | MODESTLY HARDEN | MODESTLY SOFTEN |
| 11 | PRESENT |  | ON |  |  | LOW BV | NIGHTTIME OUTDOOR | MODESTLY HARDEN |  | MODESTLY SOFTEN |
| 12 | ABSENT |  | OFF | LONG |  |  | DISTANT VIEW | HARDEN | MODESTLY HARDEN |  |
| 13 | ABSENT |  | OFF |  |  | LOW BV | NIGHT VIEW | HARDEN | MODESTLY HARDEN |  |
| 14 | ABSENT |  | OFF | LONG |  | LOW BV | NIGHT VIEW | HARDEN | MODESTLY HARDEN |  |
| 15 | PRESENT |  | OFF |  |  | HIGH BV | DIRECT LIGHT | MODESTLY SOFTEN | MODESTLY SOFTEN |  |
| 16 | PRESENT |  | OFF |  |  | INTERMEDIATE BV | CLOUDY WEATHER | MODESTLY HARDEN |  |  |

METHOD, APPARATUS AND PROGRAM FOR IMAGE PROCESSING

This nonprovisional application claims priority under 35 U.S.C. 119(a) on Patent Application No. 2002-041343 filed in Japan on Feb. 19, 2002, which is herein incorporated by reference.

BACKGROUND OF THE INVENTION

1. Field of the Invention

The present invention relates to a method and an apparatus for carrying out image processing on image data obtained by a digital camera. The present invention also relates to a program embodied on a computer-readable recording medium to cause a computer to execute the image processing method.

2. Description of the Related Art

In a digital still camera (hereinafter referred to as a digital camera), an image obtained by photography can be recorded as digital image data in a recording medium such as an internal memory or an IC card, and can be reproduced by a printer or a monitor based on the digital image data. In the case where an image obtained by a digital camera is printed, the image is expected to have as high a quality as a print generated from a negative film.

When a print is generated from such image data, the quality thereof can be improved by carrying out various types of image processing such as density conversion processing, white balance processing, gradation conversion processing, saturation enhancement processing, and sharpness processing on the image data. Consequently, a method for obtaining a higher-quality print has been proposed U.S. Pat. No. 6,011,547. In this method, photography information such as an ON or OFF state of flash and the type of lighting is added as tag information to image data obtained by a digital camera. Appropriate image processing is carried out on the image data with reference to the photography information added to the image data.

In some cases, such tag information includes information useful for image processing, such as a distance to a subject, brightness of the subject, exposure, a photometric quantity at the time of photography, and presence or absence of counterlight, in addition to an ON or OFF state of flash and the type of lighting. For this reason, various methods have also been proposed for image processing to be carried out on image data with reference to photography information (U.S. Pat. Nos. 6,133,983, 5,739,924, 5,016,039, 5,596,387, 5,710,948, and Japanese Unexamined Patent Publication Nos. 8(1996)-307767, 11(1999)-88576, for example).

Furthermore, as methods of carrying out tone processing on image data, various methods have also been proposed for calculating a tone processing condition used in gradation conversion according to a histogram of image data (Japanese Unexamined Patent Publication No. 9(1997)-200531, and U.S. Pat. No. 5,812,286, for example). Moreover, another method of calculating a tone processing condition has also been proposed (Japanese Unexamined Patent Publication No. 2000-196890) so as to cause density of a main subject such as a human face included in an image to be kept in a target density range while keeping the highest density value and the lowest density value in the image as they are.

In such image processing methods described above, image processing is carried out on image data with use of photography information. However, in the case where a main subject in an image represented by the image data varies from people to scenery for example, the appropriate image processing condition cannot be found with accuracy if the photography information is used alone.

In the methods of finding the tone processing condition described above, the appropriate tone processing condition is difficult to find in accordance with various scenes such as people and scenery, although the histogram or the information on the density is used in the methods.

SUMMARY OF THE INVENTION

The present invention has been conceived based on consideration of the above circumstances. An object of the present invention is therefore to obtain a high-quality reproduced image by carrying out accurate tone processing on image data obtained by a digital camera.

An embodiment of an image processing method of the present invention is a method of obtaining processed image data by carrying out image processing on image data obtained by a digital camera, and the image processing method comprises the steps of:

obtaining photography information added to the image data;

obtaining main part information regarding an image represented by the image data;

inferring a photography scene regarding the image data, based on the photography information and the main part information;

setting a tone processing condition in accordance with the photography scene; and obtaining the processed image data by carrying out the image processing on the image data according to the tone processing condition that has been set.

In the image processing method embodiment of the present invention, the processed image data may be obtained by carrying out the image processing on the image data according to a degree of tone change caused by density and/or color correction on the image data, in addition to the tone processing condition.

In the image processing method embodiment of the present invention, the tone processing condition in accordance with the photography scene may be set by selection from predetermined tone processing conditions.

One or more of a distance to a subject, brightness of the subject, exposure, a photometric quantity at the time of photography, information on a camera lens, and magnification, in addition to an ON or OFF state of flash and the type of lighting can be included in the "photography information". The photography information is described in tag information of the image data. Information on the date and time of photography may be included in the photography information.

The "tag information" refers to information added to the image data obtained by a digital camera. "Baseline TIFF Rev.6.0.ORGB Full Color Image" adopted for a non-compressed file of an Exit file, for example can be used as a standard of the tag information.

The "main part information" refers to information regarding a main part such as a human face included in an image represented by the image data. More specifically, presence or absence of the main part, and a size of the main part in the case of presence thereof can be used as the main part information.

In the case where the main part is a human face, the image data are subjected to skin-color extraction processing or the like. By judging whether or not an area of the extracted skin-color is equal to or larger than a predetermined value, presence or absence of a human face in the image can be judged.

The "tone processing condition" refers to a parameter for correcting tones in the image data. The tone processing condition determines whether the tones in a highlight range, in an intermediate range, and in a shadow range are softened or hardened, or determines a degree of soft tones and hard tones. The tone processing condition may be set by correcting a predetermined reference tone characteristic according to the photography scene.

The "photography scene" refers to a target of photography or a combination of the target and a photography condition such as lighting. More specifically, portrait, scenery, and close-up flash photography are listed as the photography scene, which is not limited to these examples.

An image processing apparatus of the present invention is an apparatus for obtaining processed image data by carrying out image processing on image data obtained by a digital camera, and the image processing apparatus comprises:

photography information acquisition means for obtaining photography information added to the image data;

main part information acquisition means for obtaining main part information regarding an image represented by the image data;

scene inference means for inferring a photography scene regarding the image data, based on the photography information and the main part information;

tone processing condition setting means for setting a tone processing condition in accordance with the photography scene; and image processing means for obtaining the processed image data by carrying out the image processing on the image data according to the tone processing condition that has been set.

In the image processing apparatus of the present invention, the image processing means may obtain the processed image data by carrying out the image processing according to a degree of tone change caused by density and/or color correction on the image data, in addition to the tone processing condition.

In the image processing apparatus of the present invention, the tone processing condition setting means may set the tone processing condition in accordance with the photography scene by selection from predetermined tone processing conditions.

The image processing method of the present invention may be provided as a program to cause a computer to execute the image processing method.

According to the present invention, the photography scene is inferred based on the photography information added to the image data and the main part information on the image represented by the image data. The tone processing is carried out on the image data by setting the tone processing condition according to the inferred photography scene. Therefore, the tone processing condition can be set more accurately according to the inferred photography scene than in the case of setting the tone processing condition based on the photography information alone. As a result, the processed image data can reproduce a high-quality image regardless of what the photography scene is.

In the case where color and/or density of image data are corrected, a highlight range and a shadow range of the image tend to be too light and too dark, respectively. For this reason, by carrying out the image processing on the image data according to the degree of tone change caused by color and/or density correction in addition to the tone processing condition, the highlight range and the shadow range can be prevented from being too light and too dark, respectively. Consequently, the processed image data can reproduce a higher-quality image.

Furthermore, by selecting the tone processing condition in accordance with the photography scene from the predetermined tone processing conditions, the tone processing condition can be set in a short time, which leads to efficient tone processing.

BRIEF DESCRIPTION OF THE DRAWINGS

FIG. 1 is a block diagram showing a configuration of an image processing apparatus as a first embodiment of the present invention;

FIG. 2 is a table representing photography scenes in accordance with main part information and photography information;

DESCRIPTION OF THE PREFERRED EMBODIMENTS

Figure 3:
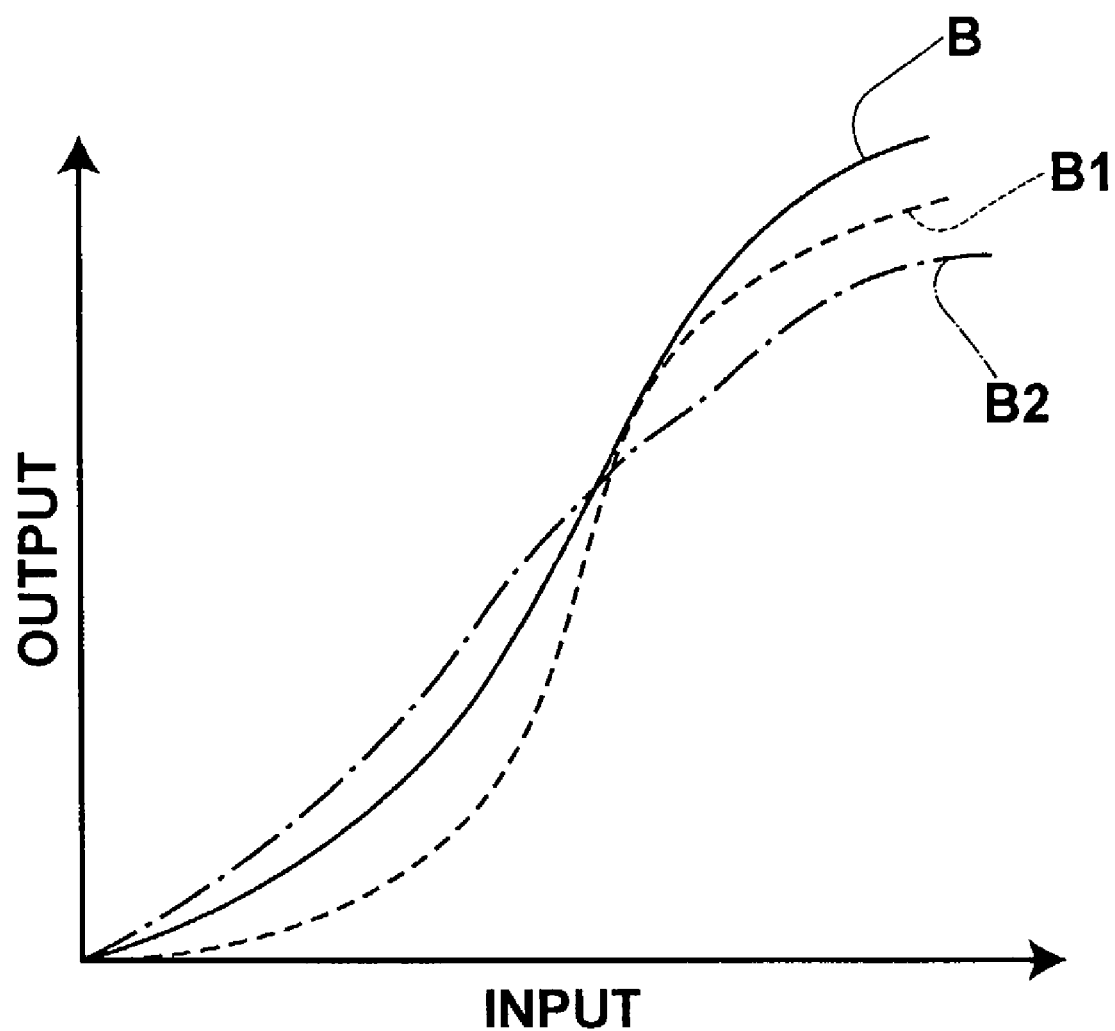
FIG. 3 is a graph showing how to correct a reference tone processing condition.

Hereinafter, embodiments of the present invention will be explained with reference to the accompanying drawings. FIG. 1 is a block diagram showing a configuration of an image processing apparatus as a first embodiment of the present invention. As shown in FIG. 1, an image processing apparatus 20 in the first embodiment reads image data S0 obtained by photography of a subject with a digital camera 10, and outputs a print P from a printer 30 by carrying out various types of image processing on the image data S0.

The image processing apparatus 20 in the first embodiment comprises the following components. Reading means 21 reads the image data S0 obtained by the digital camera 10 from a recording medium such as a memory card. Based on the image data S0, main part information acquisition means 22 obtains main part information M regarding a main part included in an image represented by the image data S0. Scene inference means 23 obtains scene information H by inferring a photography scene based on the main part information M obtained by the main part information acquisition means 22 and photography information T included in tag information added to the image data S0. A memory 24 stores various tone processing conditions in accordance with the scene information H. Tone processing condition setting means 25 reads a tone processing condition K0 corresponding to the scene information H from the memory 24, and sets a tone processing condition K1 for carrying out tone processing on the image data S0 according to the tone processing condition K0. Rough image generation means 26 generates rough image data SR by decreasing the number of pixels in the image data S0. Based on the rough image data SR, automatic set-up means 27 sets a basic tone processing condition, and conditions for density and color conversions and sharpness processing to be carried out on the image data S0. The automatic set-up means 27 then outputs a tone processing condition used as reference (hereinafter referred to as a reference tone processing condition B) based on the image data S0, and the conditions other than the reference tone processing condition B (such as the density and color conversion conditions), as image processing conditions G. Image processing means 28 obtains processed image data S1 by carrying out image processing on the image data S0 according to the image processing conditions G and the tone processing condition K1. The reading means 21 corresponds to photography information acquisition means.

In this embodiment, the photography information T includes any combination of flash information representing an ON or OFF state of flash, information on a distance to the subject, and information on magnification at the time of photography. Brightness of the subject (BV) may be included in the photography information T. Alternatively, information on date and time of photography may be included in the photography information T.

The magnification may be found by dividing a focal length by the distance to the subject. The subject brightness value may be found by (aperture value+shutter speed)-photographic sensitivity, and is found in an APEX unit. The focal length, the aperture value, and the photographic sensitivity may be included in the photography information T.

The main part information acquisition means 22 judges presence or absence of a human face in the image represented by the image data S0, and includes a result of the judgment in the main part information M. More specifically, a skin-color area is extracted from the image data S0, and the image is judged to include the human face in the case where an area of the skin-color area is equal to or larger than a predetermined threshold value Th0. In the case where the image has been judged to include the human face, the area of the skin-color area having an oval shape is found and compared with a predetermined threshold value Th1. In this manner, information is obtained on how large the area is, that is, information on how large a size of the human face is. This information may be included in the main part information M.

The scene inference means 23 infers the photography scene based on the main part information M and the photography information T. FIG. 2 shows a table representing photography scenes that can be inferred from the main part information M and the photography information T. The table shown in FIG. 2 may be stored in the scene inference means 23, and the scene inference means 23 infers the photography scene of the image with reference to the table in FIG. 2. More specifically, the photography scene may be inferred from the information on presence or absence of the human face included in the main part information M, the flash information, the information on distance to the subject and magnification, and information of another type in the photography information T. The information of another type may include information on the subject brightness value (BV). In the case where the main part information M includes the face size information, the face size information may be included in the information of another type.

The distance to the subject included in the photography information T is compared with a predetermined threshold value Th2, and the distance is judged to be long if the distance is longer than the threshold value Th2. Otherwise, the distance is judged to be short. The magnification found from the photography information T is also compared with a predetermined threshold value Th3. The distance to the subject is judged to be long in the case where the magnification is larger than the threshold value Th3. Otherwise, the distance is judged to be short.

The scene inference means 23 infers the photography scene with reference to the table in FIG. 2. In the case where the information on presence or absence of human face, the face size, and the flash information in the main part information M shows presence, a large face, and an OFF state of flash, the photography scene is judged to be a portrait scene shown in row No. 1 in the table. In the case where the information on presence or absence of human face, the flash information, and the distance to the subject in the main part information M shows presence, an ON state, and a short distance, the photography scene is judged to be a close-up flash photography scene shown in row No. 8 in the table T. The scene information H representing the inferred photography scene is output to the tone processing condition setting means 25.

The memory 24 stores the tone processing conditions according to the various types of the scene information H.

The tone processing condition setting means 25 reads the tone processing condition K0 in accordance with the scene information H from the memory 24, and sets the tone processing condition K1 by correcting according to the tone processing condition K0 the reference tone processing condition B that has been set by automatic set-up means 27 based on the image data S0. The tone processing condition K0 represents values to correct tones in a highlight range, an intermediate range, and a shadow range of the input image data S0. The reference tone processing condition B is corrected by the values of the tone processing condition K0.

For example, in the case where the scene information H represents portrait shown as No. 1 in the table of FIG. 2, the tone processing condition K0 is selected so as to soften tones in the highlight range and in the shadow range while modestly harden tones in the intermediate range, in consideration of reproducibility of skin color. In this case, if the values to correct the highlight range and the intermediate range are −5 and 2 respectively, the reference tone processing condition B shown in FIG. 3 is corrected to become a curve B1. In this manner, the tone processing condition K1 is set. The values for correction represent degrees of tone correction, and positive values harden tones and negative values soften tones. In the case where the scene information H represents a photography scene such as scenery or a still object shown in the row No. 3 in the table, the tones in the highlight range and in the shadow range are hardened and modestly softened, respectively, in consideration of reproducibility of the scenery or the still object. In this case, if the values to correct the highlight range and the shadow range are 8 and −2 respectively, the reference tone processing condition B is corrected to become a curve B2 in FIG. 3. In this manner, the tone processing condition K1 is set for this case. Furthermore, in the case where the scene information H represents a photography scene of close flash photography shown by No. 8 in the table, a color of human face tends to be too light. Therefore, the tone processing condition K0 that hardens the highlight range is selected.

For the size of human face, the tone processing condition K0 is selected to soften the highlight range more as the face size increases. In the case where the face size is small as in a group photograph, the tone processing condition K0 is selected to modestly harden the tones in the highlight range, so as to improve reproducibility of the highlight range. In the case of flash photography, the tone processing condition K0 is selected to soften the shadow range, so as to improve reproducibility of the shadow range where the light from a flash is not sufficient.

The rough image generation means 26 generates the rough image data SR by thinning pixels in the image data S0 at every several pixels.

The automatic set-up means 27 sets the reference tone processing condition B, the density conversion condition, the color conversion condition, and the sharpness processing condition according to the rough image data SR, and outputs these conditions excluding the reference tone processing condition B to the image processing means 28 as the image processing conditions G. The reference tone processing condition B is output to the tone processing condition setting means 25.

Figure 4:
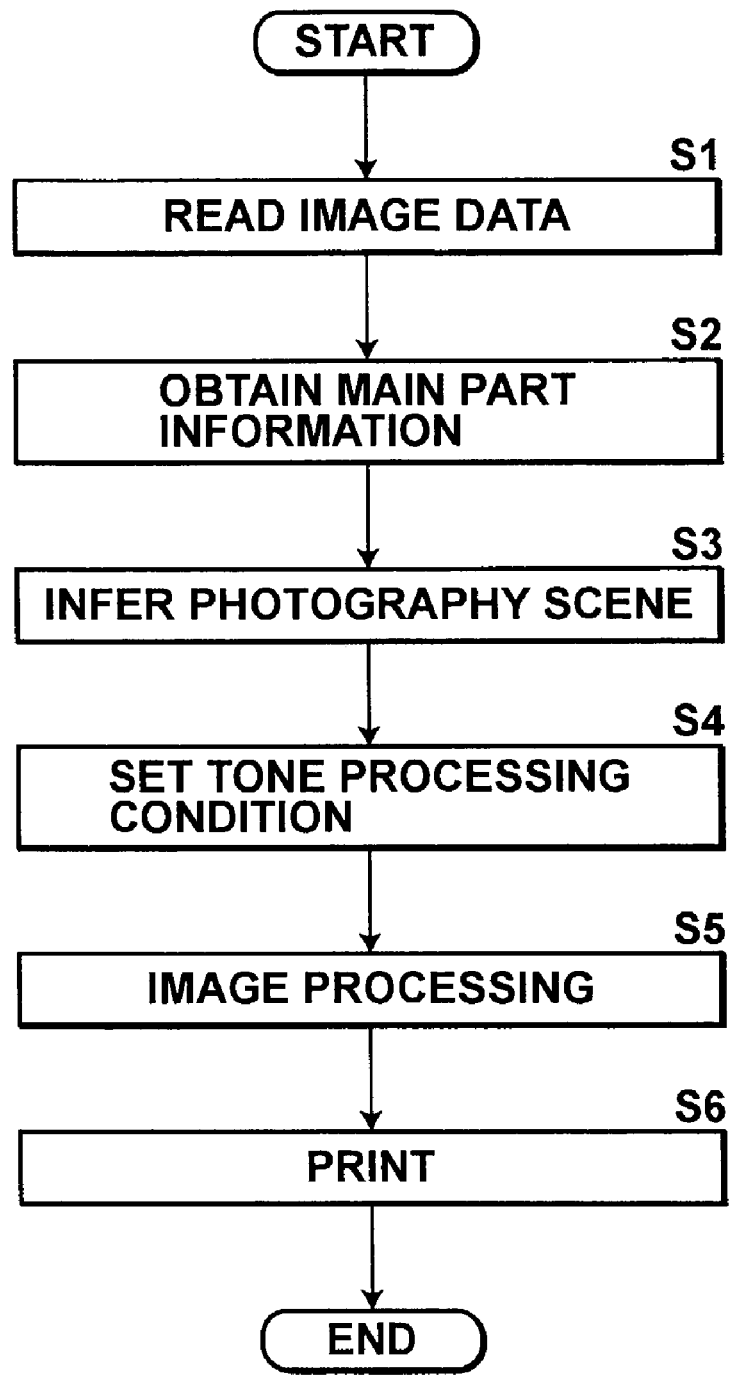
FIG. 4 is a flow chart showing the operation of the first embodiment.

The operation of the first embodiment will be explained next. FIG. 4 is a flow chart showing the operation in the first embodiment. In this case, the rough image generation means 26 generates the rough image data SR, and the automatic set-up means 27 sets the reference tone processing condition B and the image processing conditions G, based on the rough image data SR.

The reading means 21 reads the image data S0 (Step S1). The image data S0 are input to the main part information acquisition means 22 where the main part information M is obtained (Step S2). The main part information M is input to the scene inference means 23 together with the photography information T, and the scene information H is obtained by inferring the photography scene (Step S3). The scene information H is input to the tone processing condition setting means 25 where the tone processing condition K0 in accordance with the scene information H is read from the memory 24. The reference tone processing condition B is corrected based on the tone processing condition K0, and the tone processing condition K1 is set (Step S4). The tone processing condition K1 is input to the image processing means 28 where the image processing is carried out on the image data S0 according to the image processing conditions G and the tone processing condition K1, to generate the processed image data S1 (Step S5). The printer 30 prints the processed image data S1 (Step S6) to end the operation.

As has been described above, according to this embodiment, the photography scene regarding the image data S0 is inferred based on the photography information T added to the image data S0 and the main part information M regarding the image represented by the image data S0. The tone processing condition K1 is set in accordance with the inferred photography scene, and used for tone processing. Therefore, compared to the case of setting the tone processing condition K1 by using the photography information T alone, the tone processing condition K1 is set appropriately and with accuracy in accordance with the photography scene. As a result, the processed image data S1 can reproduce a high-quality image.

In this embodiment, the tone processing condition K0 represents the correction in the tones in the highlight range, in the intermediate range, and in the shadow range. However, the tone processing condition K1 may represent correction of tones in various density ranges other than the combination of the above-described three ranges, such as a combination of the highlight range and the shadow range only, or a combination of the highlight range and other density ranges.

By enabling selection of the tone processing condition K0 in accordance with the inferred photography scene from the predetermined tone processing conditions stored in the memory 24, the tone processing condition K1 can be set in a short time and the image processing can be carried out efficiently.

Figure 5:
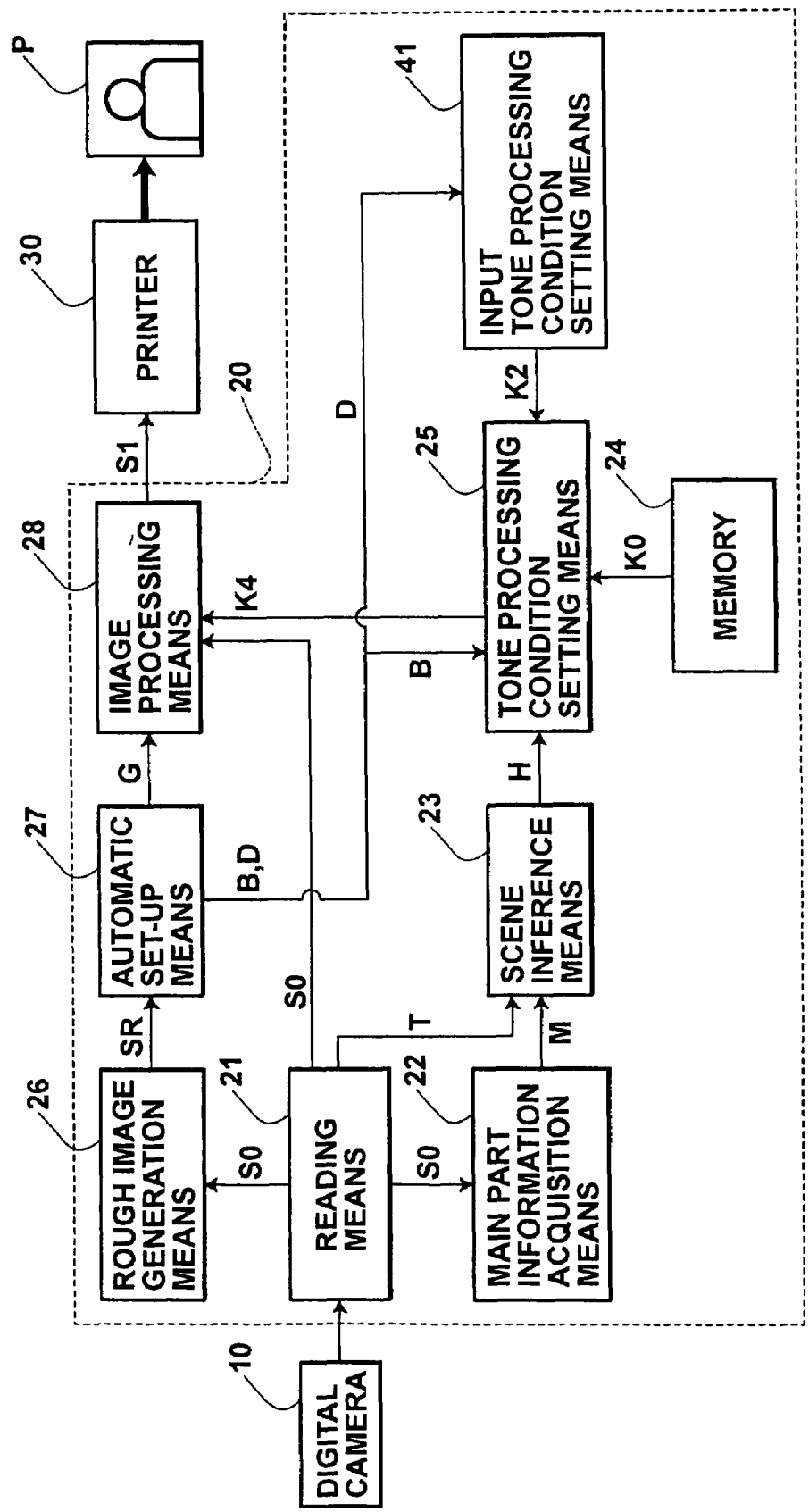
FIG. 5 is a block diagram showing a configuration of an image processing apparatus as a second embodiment of the present invention.

A second embodiment of the present invention will be explained next. FIG. 5 is a block diagram showing a configuration of an image processing apparatus of the second embodiment of the present invention. In the second embodiment, the same components as in the first embodiments have the same reference numbers, and detailed explanations thereof will be omitted. In the second embodiment, input tone processing condition setting means 41 is used for setting an input tone processing condition K2 for solving too light and/or too dark colors in a highlight range and/or in a shadow range caused by density and/or color conversion according to a density conversion condition and/or a color conversion condition (hereinafter referred to as density color conversion conditions D) among image processing conditions G set by automatic set-up means 27. Tone processing condition setting means 25 in the second embodiment sets a tone processing condition K4, based on a tone processing condition K1 and the input tone processing condition K2.

Figure 6:
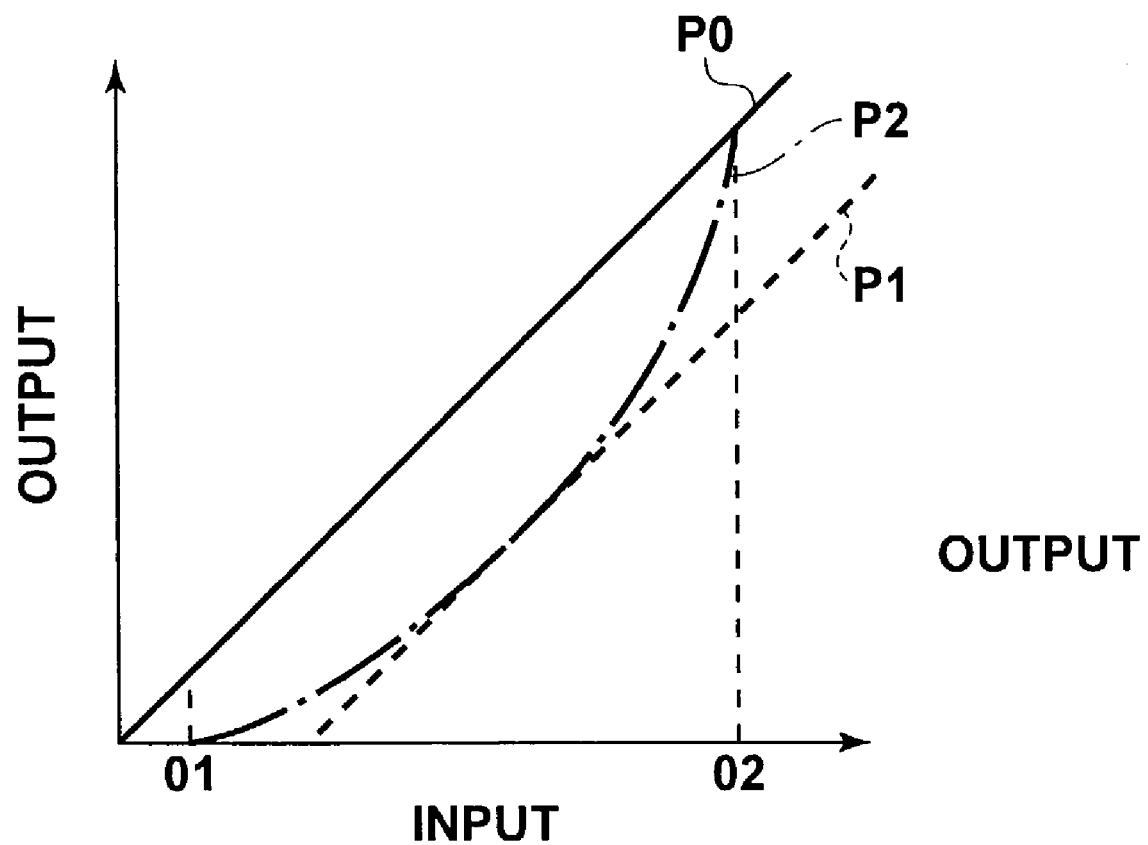
FIG. 6 is a graph showing how to set an input tone processing condition.

How to convert density will be explained first. FIG. 6 shows how to set the input tone processing condition K2. In FIG. 6, a solid line represents a density conversion condition P0 for outputting density of an image represented by image data S0 (hereinafter referred to as image density) without a change. A broken line represents a density conversion condition P1 for lowering the image density. In FIG. 6, a reference point in a highlight range that represents the lowest density to be reproduced is shown as O1, while a reference point in a shadow range that represents the highest density to be reproduced is shown as O2. The reference point O1 in the highlight range can be obtained by adding 3% of a difference between a maximum value and a minimum value to the minimum value in a histogram of the image data S0. The reference point O2 in the shadow range can be obtained by subtracting 3% of the difference between the maximum value and the minimum value from the maximum value in the histogram of the image data S0.

In the case where the image density needs to be lowered due to a failure in AE processing or the like by a digital camera 10, the image data S0 are converted according to the density conversion condition P1. However, in this case, the highlight range becomes too light while the density in the shadow range becomes insufficient. For this reason, density conversion condition P2 for hardening the shadow range and softening the highlight range is found and used as the input tone processing condition K2. By carrying out density conversion according to the input density conversion condition K2, the highlight range does not become too light and the density in the shadow range can be reproduced sufficiently. In an intermediate range, the density conversion condition P2 is the same as the density conversion condition P1. Therefore, the density conversion condition P2 can convert the image data S0 so that the image data S0 have appropriate density in the intermediate range where a main subject tends to be included in many cases.

Figure 7:
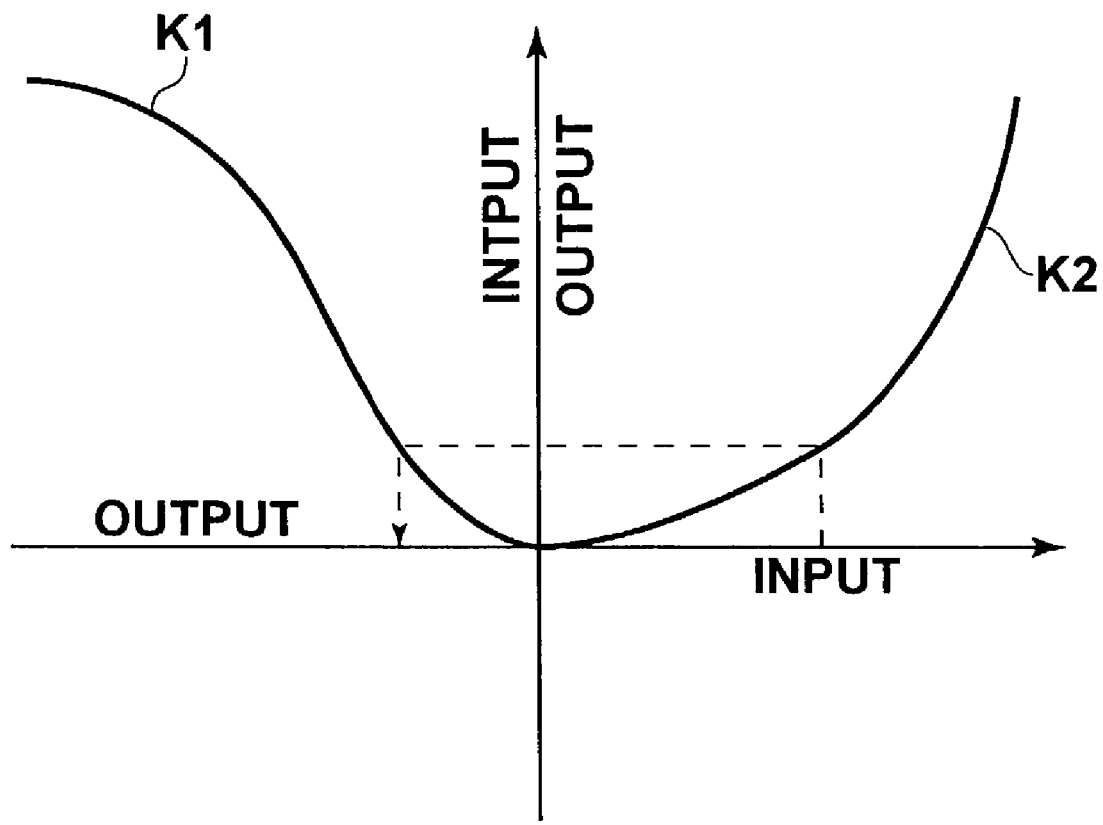
FIG. 7 is a graph showing combination of tone processing conditions.

The tone processing condition setting means 25 obtains the tone processing condition K1 by correcting a reference tone processing condition B based on a tone processing condition K0 read from a memory 24. At the same time, the tone processing condition setting means 25 combines the input tone processing condition K2 set by the input tone processing condition setting means 41 and the tone processing condition K1, to obtain the tone processing condition K4. For example, as shown in FIG. 7, the tone processing condition K4 is obtained by combining the input tone processing condition K2 in the first quadrant and the tone processing condition K1 in the second quadrant.

In this case, combination with the tone processing condition K1 may change the density determined by the input tone processing condition K2, regarding a main part in an image represented by the image data S0. Therefore, it is preferable for the input tone processing condition K2 to be combined with the tone processing condition K1 in consideration of the density change in the main part.

A color conversion condition is found as in the case of density conversion condition, for each of RGB colors comprising the image data S0. Therefore, the color conversion condition is used as the input tone processing condition K2. In this case, the input tone processing condition K2 is combined with the tone processing condition K1 for each of the RGB colors, and used as the tone processing condition K4 for each of the RGB colors. In the case where both the density conversion condition and the color conversion condition are necessary, the density conversion condition and the color conversion condition are combined. In this manner, a condition for converting density and color is found for each of the RGB colors, and used as the input tone processing condition K2. The input tone processing condition K2 is combined with the tone processing condition K1 for each of the RGB colors in this case, and used as the tone processing condition K4 for each of the RGB colors.

Figure 8:
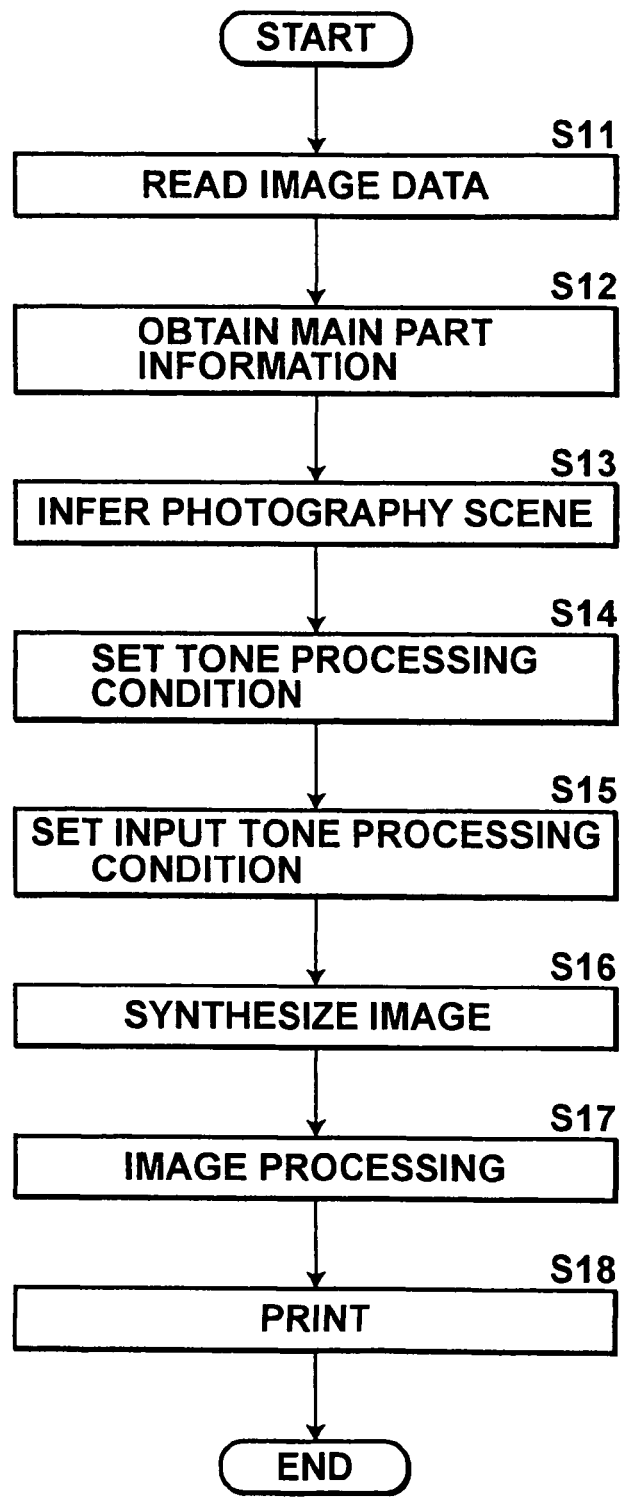
FIG. 8 is a flow chart showing the operation of the second embodiment.

The operation of the second embodiment will be explained next. FIG. 8 is a flow chart showing the operation of the second embodiment. Rough image generation means 26 generates rough image data SR and the automatic set-up means 27 sets the reference tone processing condition B and the image processing conditions G, based on the rough image data SR.

Reading means 21 reads the image data S0 (Step S11). The image data S0 are input to main part information acquisition means 22 where main part information M is obtained (Step S12). The main part information M is input to scene inference means 23, together with photography information T. The scene inference means 23 infers a photography scene and obtains scene information H (Step S13). The scene information H is input to the tone processing condition setting means 25, and the tone processing condition setting means 25 reads the tone processing condition K0 in accordance with the scene information H from the memory 24, and sets the tone processing condition K1 by correcting the reference tone processing condition B according to the tone processing condition K0 (Step S14).

Among the image processing conditions G set by the automatic set-up means 27, the density color conversion conditions D are input to the input tone processing condition setting means 41 where the input tone processing condition K2 is set (Step S15).

The input tone processing condition K2 is input to the tone processing condition setting means 25, and the tone processing condition setting means 25 combines the input tone processing condition K2 with the tone processing condition K1. In this manner, the tone processing condition K4 is obtained (Step S16). The tone processing condition K4 is input to image processing means 28, and the image processing means 28 carries out image processing on the image data S0 according to the image processing conditions G and the tone processing condition K4. In this manner, processed image data S are obtained (Step S17). A printer 30 prints the processed image data S1 (Step S18) to end the operation.

As has been described above, in the second embodiment, the tone processing condition K4 is set based on the input tone processing condition K2 found in consideration of too light or too dark colors caused by density color correction of the image data S0, in addition to the tone processing condition K1. Therefore, in the case where density color correction has been carried out on the image data S0, the processed image data S1 can reproduce a high-quality image without too light or too dark colors.

In the above embodiments, the tone processing condition K0 is selected from the memory 24, based on the scene information H. However, the tone processing condition K0 may be calculated according to the scene information H.

In the above embodiments, the reference tone processing condition B is corrected based on the tone processing condition K0 to obtain the tone processing condition K1. However, the memory 24 may store the tone processing condition K1 in accordance with the various types of the scene information H (hereinafter referred to as the tone processing conditions K1) so that the tone processing condition K1 is read from the memory 24 according to the scene information H that has been obtained. In this case, if the tone processing conditions K1 corresponding any possible scenes are stored in the memory 24, the memory 24 is occupied largely by the tone processing conditions K1. Therefore, only the tone processing conditions used as references are stored in the memory 24 so that the tone processing condition K1 can be set by interpolating the tone processing conditions used as references, according to the scene information H.

In the above embodiments, the main part information M includes information on presence or absence of human face and the size thereof. However, since the main part such as a human face often appears in the center of an image, the density and colors in the center of the image represented by the image data S0 may be used as the main part information M. Furthermore, the density conversion condition in the image processing conditions G is a condition for converting the density of the main part in the image data S0 to become appropriate density. Therefore, the density conversion condition may be used as the main part information M, since the density conversion condition enables understanding of how the density appears in the main part.

In the above embodiments, in the case where the photography information T includes information on date and time of photography, the tone processing condition K1 maybe set according to the information on date and time of photography. For example, if the photography was carried out in daytime on a summer day, the image is inferred to be a high-contrast image, and the tone processing condition K1 is set to soften the intermediate range of the reference tone processing condition B.

What is claimed is:

1. An image processing method for obtaining processed image data by carrying out image processing on image data obtained by a digital camera, the image processing method comprising the steps of:
   obtaining photography information added to the image data;
   obtaining main part information regarding an image represented by the image data based solely from the image data;
   inferring a photography scene regarding the image data, based on the photography information and the main part information;
   setting a tone processing condition in accordance with the photography scene by selecting a predetermined tone processing condition from a plurality of predetermined tone processing conditions;

obtaining the processed image data by carrying out the image processing on the image data according to the tone processing condition that has been set.

2. The image processing method as defined in claim 1, wherein the step of obtaining the processed image data comprises:
carrying out the image processing on the image data according to a degree of tone change caused by a density correction on the image data, or caused by a color correction on the image data or both, in addition to the tone processing condition.

3. The image processing method as defined in claim 1, wherein the step of setting the tone processing condition further comprises:
determining a reference tone processing condition of the image; and
setting the tone processing condition based on the selected predetermined tone processing condition and the reference tone processing condition,
wherein the tone processing condition represents a correction of densities on the image, or a correction of colors on the image, or both.

4. The image processing method as defined in claim 3, wherein the step of determining the reference tone processing condition of the image comprises:
generating a rough image of image, wherein the rough image is a reduced image of the image; and
determining the reference tone processing condition based on the rough image.

5. The image processing method as defined in claim 3, wherein the predetermined tone processing condition represent correction of tones in of predetermined number of density ranges; and
wherein the tone processing condition represent correction of tones in any combination of the predetermined number of density ranges.

6. The image processing method as defined in claim 5, wherein the predetermine number of density ranges is three and the ranges are a highlight range, an intermediate range, and a shadow range.

7. The image processing method as defined in claim 3, wherein the tone processing condition represents the correction of densities on the image, or a correction of colors on the image, or both for each of the red, green and blue colors.

8. The image processing method as defined in claim 3, wherein the step of setting the tone processing condition comprises:
setting a highest density value to be reproduced based on the image; or
setting a lowest density value to be reproduced based on the image; or both.

9. The image processing method as defined in claim 8, wherein the step of setting the highest density value to be reproduced comprises:
determining Dmax and Dmin, wherein Dmax are Dmin are the maximum and minimum density values of the image, respectively; and
setting $D_{max,r}=D_{max}-X(D_{max}-D_{min})$, wherein $D_{max,r}$ is the highest density value to be reproduced and X is a predetermined percentage greater than 50%; and
wherein the step of setting the lowest density value to be reproduced comprises:
determining Dmax and Dmin, wherein Dmax are Dmin are the maximum and minimum density values of the image, respectively; and setting $D_{min,r}=Y(D_{max}-D_{min})+D_{min}$, wherein $D_{min,r}$ is the lowest density value to be reproduced and Y is a predetermined percentage less than 50%.

10. The image processing method as defined in claim 1, further comprising:
printing or displaying the obtained processed image data.

11. An image processing apparatus for obtaining processed image data by carrying out image processing on image data obtained by a digital camera, the image processing apparatus comprising:
photography information acquisition means for obtaining photography information added to the image data;
main part information acquisition means for obtaining main part information regarding an image represented by the image data based solely from the image data;
scene inference means for inferring a photography scene regarding the image data, based on the photography information and the main part information;
tone processing condition setting means for setting a tone processing condition in accordance with the photography scene by selecting a predetermined tone processing condition from a plurality of predetermined tone processing conditions; and
image processing means for obtaining the processed image data by carrying out the image processing on the image data according to the tone processing condition that has been set.

12. The image processing apparatus as defined in claim 11, wherein the image processing means obtains the processed image data by carrying out the image processing according to a degree of tone change caused by a density correction on the image data, or caused by a color correction on the image data or both, in addition to the tone processing condition.

13. The image processing apparatus as defined in claim 11, wherein the tone processing condition setting means
generates rough image data based on the image data, wherein the rough image data is a reduced version of the image data, and
determines a condition for density correction for the image data based on the rough image data, the condition for density correction being included in the tone processing condition.

14. The image processing apparatus as defined in claim 11, wherein the tone processing condition setting means
generates rough image data based on the image data, wherein the rough image data is a reduced version of the image data, and
determines a condition for color correction for the image data based on the rough image data, the condition for color correction being included in the tone processing condition.

15. A computer-readable medium including a program that causes a computer to execute an image processing method for obtaining processed image data by carrying out image processing on image data obtained by a digital camera, the program comprising the steps of:
obtaining photography information added to the image data;
obtaining main part information regarding an image represented by the image data based solely from the image data;
inferring a photography scene regarding the image data, based on the photography information and the main part information;

setting a tone processing condition in accordance with the photography scene by selecting a predetermined tone processing condition from a plurality of predetermined tone processing conditions;

obtaining the processed image data by carrying out the image processing on the image data according to the tone processing condition that has been set.

16. The computer readable medium as defined in claim 15, wherein the step of obtaining the processed image data comprises:

carrying out the image processing on the image data according to a degree of tone change caused by a density correction on the image data, or caused by a color correction on the image data or both, in addition to the tone processing condition.

17. The computer-readable medium as defined in claim 15, wherein the step of setting the tone processing condition comprises:

generating rough image data based on the image data, wherein the rough image data is a reduced version of the image data; and determining a condition for density correction for the image data based on the rough image data, the condition for density correction being included in the tone processing condition.

18. The computer-readable medium as defined in claim 15, wherein the step of setting the tone processing condition comprises:

generating rough image data based on the image data, wherein the rough image data is a reduced version of the image data; and determining a condition for color correction for the image data based on the rough image data, the condition for color correction being included in the tone processing condition.

19. An image processing method for obtaining processed image data by carrying out image processing on image data obtained by a digital camera, the image processing method comprising the steps of:

obtaining photography information added to the image data;

obtaining main part information regarding an image represented by the image data based solely from the image data by determining whether a human face is present or absent in the image data and including information regarding the presence or absence of the human face in the main part information;

inferring a photography scene regarding the image data, based on the photography information and the main part information;

setting a tone processing condition in accordance with the photography scene;

obtaining the processed image data by carrying out the image processing on the image data according to the tone processing condition that has been set.

20. The image processing method as defined in claim 19, wherein step of obtaining the main part information further comprises:

determining a size of the human face in the image when it is determined that the human face is present; and including information regarding the size of the human face in the main part information.

21. The image processing method as defined in claim 19, wherein the step of determining the presence of absence of the human face comprises:

extracting a skin-color area from the image;

determining whether a size of the skin-color area is greater than or equal to a predetermined skin-color area threshold;

determining that the human face is present when the size of the skin-color area is greater than or equal to the predetermined skin-color area threshold; and determining that the human face is absent when the size of the skin-color area is less than the predetermined skin-color area threshold.

22. An image processing method for obtaining processed image data by carrying out image processing on image data obtained by a digital camera, the image processing method comprising the steps of:

obtaining photography information added to the image data;

obtaining main part information regarding an image represented by the image data based solely from the image data;

inferring a photography scene regarding the image data, based on the photography information and the main part information;

setting a tone processing condition in accordance with the photography scene;

obtaining the processed image data by carrying out the image processing on the image data according to the tone processing condition that has been set;

wherein the inferred photography scene is not explicitly indicated in the photography information and not explicitly indicated in the main part information;

wherein the photography information includes any one or more of information regarding whether a flash was used or not, a distance of a subject, an image magnification, and a subject brightness value; and wherein the main part information includes information regarding a presence or absence of a human face in the image and a size of the human face when the human face is indicated to be present.

23. The image processing method as defined in claim 22, wherein the step of inferring the photography scene comprises:

inferring the photography scene to be any one a portrait, class photo, scenery, still object, close flash photography, daytime synchronous photography, nighttime outdoor, distant view, night view, direct light, and cloudy weather based on the photography information and the main part information.

24. An image processing method for obtaining processed image data by carrying out image processing on image data obtained by a digital camera, the image processing method comprising the steps of:

obtaining photography information added to the image data;

obtaining main part information regarding an image represented by the image data based solely from the image data;

inferring a photography scene regarding the image data, based on the photography information and the main part information;

setting a tone processing condition in accordance with the photography scene; and obtaining the processed image data by carrying out the image processing on the image data according to the tone processing condition that has been set; and wherein the step of setting the tone processing condition comprises:

generating rough image data based on the image data, wherein the rough image data is a reduced version of the image data; and determining a condition for density correction for the image data based on the rough image data, the condition for density correction being included in the tone processing condition.

25. An image processing method for obtaining processed image data by carrying out image processing on image data obtained by a digital camera, the image processing method comprising the steps of:

obtaining photography information added to the image data;

obtaining main part information regarding an image represented by the image data based solely from the image data;

inferring a photography scene regarding the image data, based on the photography information and the main part information;

setting a tone processing condition in accordance with the photography scene; and obtaining the processed image data by carrying out the image processing on the image data according to the tone processing condition that has been set; and wherein the step of setting the tone processing condition comprises:

generating rough image data based on the image data, wherein the rough image data is a reduced version of the image data; and determining a condition for color correction for the image data based on the rough image data, the condition for color correction being included in the tone processing condition.

26. An apparatus processing image data, comprising:

a reading device configured to read the image data obtained by a digital camera and configured to read photography information added, wherein the photography information is included as a tag to the image data;

a main part determining device configured to determine main part information regarding an image represented by the image data read by the reading device based solely from the image data;

a scene inferring device configured to infer a scene type of the based on the photography information read by the reading device and the main part information determined by the main part determining device;

a tone processing condition setting device configured to set a tone processing condition by selecting a predetermined tone processing condition from a plurality of predetermined tone processing conditions in accordance with the scene type inferred by the scene inferring device; and an image processing device configured to process the image data read by the reading device in accordance with the tone processing condition set by the tone processing condition setting device and configured to output the processed image data.

* * * * *